United States Patent [19]

Claassen et al.

[11] 4,296,635
[45] Oct. 27, 1981

[54] TRANSDUCER DEVICE FOR MEASURING THE INTERNAL PRESSURE IN PIPES

[75] Inventors: Peter Claassen; Helmut List; Rudolf Zeiringer, all of Graz, Austria

[73] Assignee: Hans List, Graz, Austria

[21] Appl. No.: 158,515

[22] Filed: Jun. 11, 1980

[51] Int. Cl.³ .............................................. G01L 7/02
[52] U.S. Cl. ................................. 73/730; 73/119 A; 73/DIG. 4
[58] Field of Search ............... 73/730, 119 A, DIG. 4

[56] References Cited

U.S. PATENT DOCUMENTS

| | | | |
|---|---|---|---|
| 4,065,969 | 1/1978 | Dinwiddie | 73/730 |
| 4,194,401 | 3/1980 | Claassen et al. | 73/730 |
| 4,216,403 | 8/1980 | Krempl et al. | 73/119 A |
| 4,257,260 | 3/1981 | Beatson et al. | 73/119 A |

Primary Examiner—Donald O. Woodiel
Attorney, Agent, or Firm—Watson, Cole, Grindle & Watson

[57] ABSTRACT

A transducer device for measuring the internal pressure in pipes, comprises two housing parts which are articulately connected with one another by a connecting element and adapted to be fixedly mounted on the pipe by means of a clamping device. Each housing part contains at least one measuring element with a bipolar take-off of the test signals. At least one pole of each take-off is electrically conductingly connected with a part of the connecting element which is electrically insulated relative to the other pole and the connecting element comprises connection terminals for the further conduction or transmission of the test signals. The other pole is potentially in direct connection with the pipe. Thereby, a convenient and easy way is created for achieving electric compensation of the interfering signals within the transducer itself, thus replacing the separate, in each case bipolar conduction of the test signals out of the two housing parts with a combined, now altogether bipolar outgoing lead for the fully compensated test signals from the transducer.

10 Claims, 6 Drawing Figures

TRANSDUCER DEVICE FOR MEASURING THE INTERNAL PRESSURE IN PIPES

BACKGROUND OF THE INVENTION

This invention relates to a transducer device for measuring the internal pressure in pipes, comprising two housing parts and a connecting element, the housing parts are articulately connected with one another by the connecting element and adapted to be fixedly mounted on the pipe to be tested by means of a clamping device, and wherein each housing part contains at least one measuring element with a bipolar take-off of test signals.

DESCRIPTION OF THE PRIOR ART

In test data transducers of this kind it is known to employ measuring elements which, for compensation of spurious, interfering signals generated by bending or oscillations in the line, are so arranged in the device as to allow such interfering signals in two juxtaposed elements being electrically compensated.

For easy attachment and removal of a transducer device of this kind to and from a pipeline at any time, the housing consists of two parts hinged on one side thereof to a connecting element so that it can be readily pushed over a pipeline and folded down to close the housing. Subsequently the transducer device is clamped fast on the pipe by means of screws or with the aid of a turnbuckle or snap fastening on the side thereof which is opposite the said connecting element.

The relative movability of the two housing parts, whilst being necessary for operative application of the transducer to the pipeline, creates problems in respect of the manner in which the take-off lugs or terminals of the measuring elements are conducted out of the housing so that the test signals issued by these elements can be evaluated.

It is possible, for example, to combine the terminal lugs of all measuring elements in each housing part and conduct the test signals from each housing part separately out of the device by means of a connector plug or a fixed i.e. permanently attached cable. Alternatively a connector plug or fixed, i.e. permanently attached cable could be provided on one of the two housing parts, the connection with the output lugs of the second housing part being made by a connecting cable of minimum length arranged on the pick-up device. It is vitally important to ensure that this short connecting cable cannot be damaged when the two housing parts of the device are opened and closed.

However, both these methods entail an increase in respect of weight and volume of the pick-up device in as much as they require either two bipolar connecting plugs or separate, electrically insulating and tension-relieving lead-throughs of the connecting cable through the transducer housing. In view of the fact that the small overall size and low weight of pick-ups of the kind specified contribute vitally to a reduction of spurious interference signals, neither of these two methods is particularly suitable.

SUMMARY OF THE INVENTION

It is an object of the present invention to arrange for the test signals to be conducted out of transducer devices of the kind specified in a simple, operatively safe, space-, weight- and volume-saving manner and without requiring additional connecting cables between the two parts of the housing.

According to this invention this is achieved thanks to the fact that at least one pole of each take-off is electrically conductingly connected with a part of the connecting element which part is electrically insulated relative to the other pole and that the connecting element comprises terminals for the further conduction or transmission of the test signals, the other pole being, where applicable, in direct connection with the pipe. By a connection of the poles of each measuring element with the corresponding poles of the measuring element opposite thereto in the other housing part a convenient and easy way is created for achieving electric compensation of the interfering signals within the transducer itself, thus replacing the separate, in each case bipolar conduction of the test signals out of the two housing parts with a combined, now altogether bipolar outgoing lead for the fully compensated test signals from the transducer.

According to a further development of the invention the electrically conducting connection between one pole of each take-off and the connecting element consists of contact bridge pieces which, on the one hand embrace the connecting element of the two housing parts in cup- or shell-like manner and, on the other hand, are so arranged in the housing as to make safe and reliable contact with the corresponding pole of the measuring element. Such an arrangement ensures a simple electric connection without entailing additional assembly costs.

According to a further proposal of this invention at least one of the parts of the connecting element which are connected with one of the terminal poles may comprise a connector plug, e.g., a flat plug. Thanks to the provision of this plug on the connecting element additional outlay for conducting the test signals out of the housing can be kept very low.

In further development of the invention one part of the connecting element between the two housing parts may be an electrically conducting bolt, supported in both housing parts and representing the hinge or articulation between the housing parts. This very simple and basic form of hinge joint between the two housing parts also affords a simple and secure transmission of test signals.

According to another proposal of the invention the connecting element may comprise a connector part which is in electrical connection with the other pole of each signal take-off and electrically insulated relative to the said bolt.

One pole of the signal take-off is electrically connected with the bolt, but here the connecting element is provided with a connector part which is electrically insulated relative to said bolt and through which the desired combination and joint lead-out of the other pole of the test signals is made. Thanks to this arrangement it is possible to take full advantage of the essential feature of this invention, namely that any occuring interference signals are electrically compensated within the pick-up device itself so that the test signals from both housing parts can be conducted jointly out of the device even if the latter is applied to painted, varnished or otherwise electrically non-conducting pipelines.

According to a further embodiment of the invention the other pole of each element take-off may be electrically connected with the connector part by means of scissor-type movable contact blades. This ensures durable and reliable contacting of the other take-off pole relative to the connector part even after frequently repeated opening and closing of the transducer housing.

According to another proposal of this invention the connector part may be designed as the first contact and the end of the bolt may be designed as the second contact of a bipolar connector sleeve, or socket. This has the advantage that now the amplifier cable requires only a single plug and the co-action with the connector socket according to this invention ensures a simple and secure electric connection between measuring element and amplifier.

Furthermore, according to this invention both housing parts of the transducer device may consist of an electrically insulating material, especially a plastics material, and are preferably made as injection mouldings. This, in the first place, eliminates all problems regarding relative insulation of the various terminal lugs in the housing and, secondly, makes for easy and inexpensive production of the transducer device. The comparatively low application forces required for the reliable functioning of devices of the kind specified can be easily coped with by plastic injection mouldings of this type.

According to a further proposal of this invention the contact bridge pieces which make the electrical connection between the terminal lugs of one pole on the measuring element and the bolt may be integrated in the housing parts, preferably, as integral parts of the injection moulding. Such an arrangement also contributes to simplified production as well as ensuring a rigid location of the contact bridge pieces in the housing which in turn enables a secure and reliable transmission of the test signals from the measuring elements to the bolt.

DESCRIPTION OF THE DRAWINGS

The present invention hereinafter is more particularly described with reference to the embodiments shown by way of example in the accompanying drawings wherein.

Figure 1:
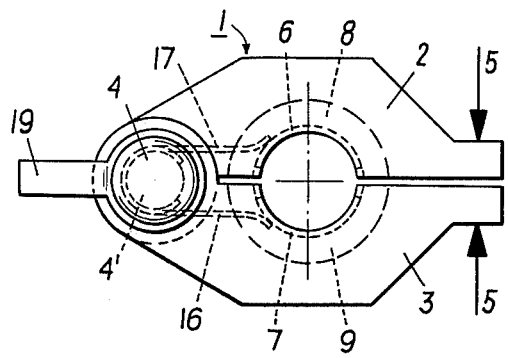
FIG. 1 is a lateral view of a transducer device with unipolar lead-out of the test signals through the bolt of the connecting element.

The housing 1 of the transducer comprises two housing parts 2 and 3 which, for easy application to a pipeline (not shown) are articulately connected on one side thereof by means of the connecting element 4 which latter comprises the bolt 4', whilst on the other side they are provided with a suitable tensioning or fastener device allowing a force in direction of arrows 5 to be applied and thus to clamp the two housing parts 2, 3 fast on the pipeline to be tested. The measuring elements 6, 7 are so arranged in housing parts 2 and 3 as to extend each in a substantially semi-circular arc around the pipe when the device is clamped fast thereon and when the tensioning or clamping device is operative, i.e. in the presence of a clamping force in direction of arrows 5, to be pressed against the pipe by the elastic supporting elements 8 and 9 thus ensuring frictional transmission of pipe surface deformations to the measuring elements 6 and 7. The semicircular recesses 10, 11, 12 and 13 in the two housing parts 2 and 3 are so designed as to have a firm grip on the pipe when the pick-up is clamped fast on the pipeline thus rendering the application force applied by the elastic elements 8 and 9 to the measuring elements 6 and 7 relative to the pipeline independent of the clamping force which is effective in the direction of arrows 5. This also ensures that the transducer as a whole sits firmly on the pipe and pipe vibrations are shared by housing 1 so that practically they do not affect or distort the test signal.

The measuring elements 6 and 7 may be, for example, piezoelectric foils, wherein, in accordance with the familiar piezo principle, tension-compression variations generate electric charges at the foil surface which are taken off in bipolar form through electrically conducting contact layers applied by vapour deposition to both sides of the foil, and appropriately further processed. Alternatively capacitive measuring foils may be used in which case the foil would consist of at least two electrode layers separated by an elastic insulating layer, which together form a condenser. The pipeline itself may also be used as an electrode. Any circumferential variation of the pipeline entails a variation in electrode spacing so that the capacitance of the condenser is correspondingly varied and this allows the conversion of a pressure variation into a test signal.

Figure 2:
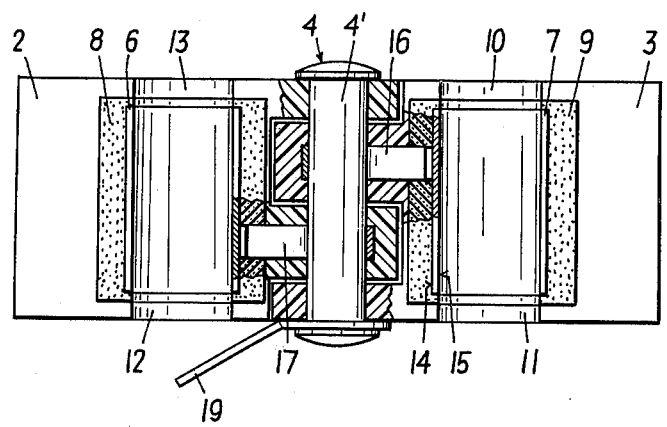
FIG. 2 shows the transducer according to FIG. 1 in open position.

Now, according to FIG. 2, the outer poles 14, i.e., the electrically conducting contact layers of the measuring elements 6 and 7 which in fitted position of the transducer are further away from the pipeline, are electrically connected via contact bridge pieces 16, 17 with the bolt 4'. The end of bolt 4' which protrudes from the housing 1 carries a flat plug 19 designed for the connection thereto of the amplifier connection cable (not shown).

The two housing parts 2 and 3 are plastic injection mouldings. This makes it easy to conduct the inner poles 15 of each bipolar lead-out or take-off, i.e., those poles which are nearer to the pipe when the device is in fitted position, out of the device directly through the pipe on which the device is clamped fast because the bolt 4' which is connected with the outer poles 14 is electrically insulated relative to the pipe by the plastic housing 1.

Figure 3:
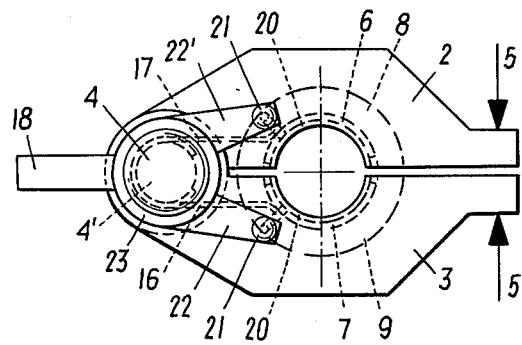
FIG. 3 is a side view of a transducer with bipolar lead-out of the test signals through the bolt of the connecting element, which latter comprises a flat plug.
Figure 4:
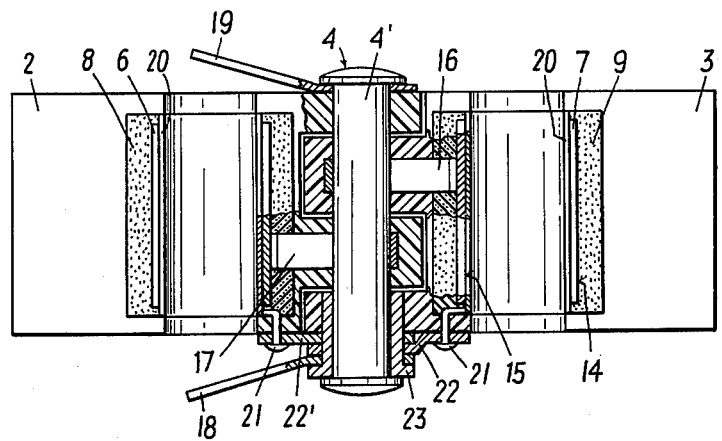
FIG. 4 shows the transducer according to FIG. 3 in open position.

In order to obtain a simple and secure lead-out of the test signals also in transducer devices which are designed for application to painted or otherwise electrically non-conducting pipe surfaces, the inner pole 15 of each of the two measuring elements 6 and 7 is, as shown in FIGS. 3 and 4, provided with an electrically conducting protective foil 20, which may consist of copper-beryllium. Each of these protective foils 20 is soldered by a terminal lug 21 to a contact strip 22, 22'. The insulating sleeve 23 which is fitted at the bolt end carries the contact strips 22, 22' which are externally of the housing 1 as well as a connector part 18, here in the form of a flat plug, and takes care of the electrical insulation of these parts which are connected with the inner poles 15 relative to bolt 4'. The latter, as already described in connection with FIGS. 1 and 2, is connected via contact bridge pieces 16 and 17 with the outer pole 14 of each of the measuring elements 6 and 7 and also carries a flat plug 19 at its end opposite the insulating sleeve 23.

Figure 5:
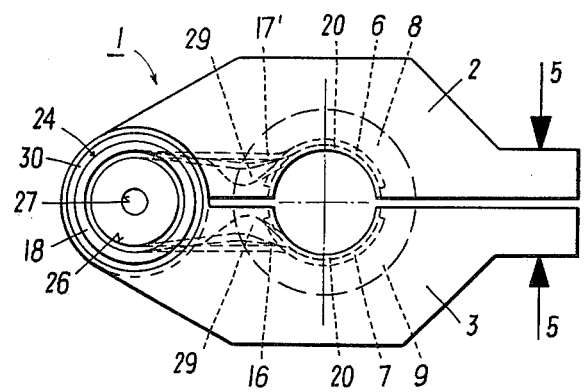
FIG. 5 is a side view of a transducer with bipolar lead-out through the connecting element which latter comprises a bipolar connector sleeve or socket.
Figure 6:
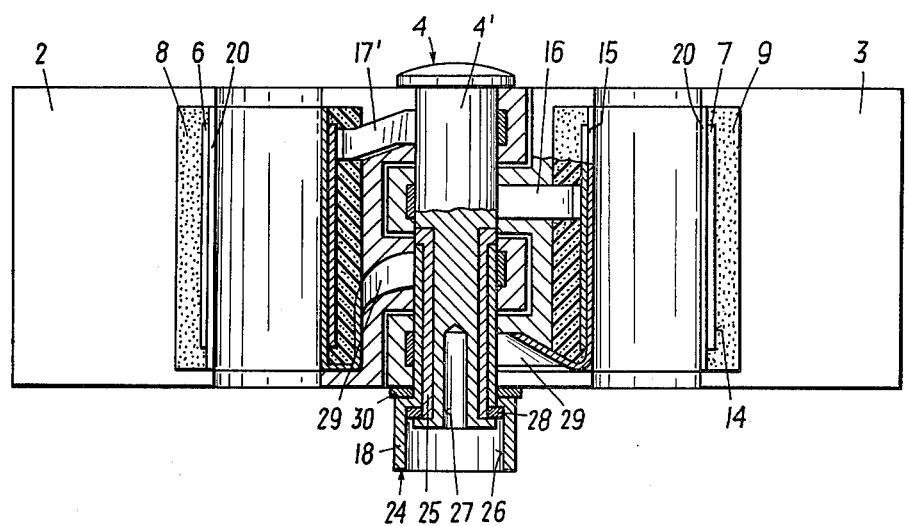
FIG. 6 shows the transducer according to FIG. 5 in open position.

In the arrangement shown in FIGS. 5 and 6 the connecting element is designed on one side as a part of a bipolar connecting socket or sleeve 24 for the amplifier connection cable (not shown). The connector part 18 which is electrically insulated by the sleeve 25 and insulating ring 28 relative to bolt 4' is provided with an annular washer 30 next to housing 1 and designed as a first contact 26 whilst the end of bolt 4' is designed as the second contact 27 of the bipolar connector socket 24. Again the connection between the outer poles 14 of the measuring elements 6 and 7 and the bolt 4' is made by contact bridge pieces 16 and 17'. The protective foils 20 which are in contact with the inner poles 15 of the measuring elements 6 and 7 are provided with extended terminal lugs 29 which are guided in the two housing parts 2 and 3 in such a way as to be electrically connected with the first contact 26 of the bipolar connector socket 24.

It will be appreciated that thanks to the electrical connection of the corresponding poles of the measuring elements which are opposite each other when the device is clamped fast on the pipe compensation of interfering signals generated by distortions and oscillations of the pipeline is also fully accomplished within the transducer device according to FIGS. 3 to 6 i.e. prior to the final lead-out of the test signals from the device and their further transmission arranged in a very simple and convenient manner.

I claim:

1. A transducer device for measuring the internal pressure in pipes, comprising two housing parts and a connecting element, wherein said housing parts are articulately connected with one another by said connecting element and adapted to be fixedly mounted on the pipe by means of a clamping device, each of said housing parts contains at least one measuring element with a bipolar take-off of test signals, at least one pole of each take-off is electrically conductingly connected with a part of said connecting element which is electrically insulated relative to the other pole, and the connecting element comprises connection terminals for the further conduction or transmission of the test signals, the said other pole being potentially in direct connection with the pipe.

2. A transducer device according to claim 1, wherein the electrically conducting connection between one pole of each take-off and said connecting element is made by contact bridge pieces.

3. A transducer device according to claim 1, wherein said two housing parts are made from an electrically insulating material.

4. A transducer device according to claim 3, wherein said two housing parts are made from a plastic material and produced as injection mouldings.

5. A transducer device according to claim 2 or 4, wherein said contact bridge pieces are integrated as integrally moulded parts in said housing parts.

6. A transducer device according to claim 1, wherein at least one of the parts of said connecting element which is connected with one of the poles of the take-off comprises a connector plug, e.g. a flat plug.

7. A transducer device according to claim 1, wherein the one part of said connecting element consists of an electrically conducting bolt supported in said both housing parts and providing the articulated connection of the housing parts.

8. A transducer device according to claim 6 or 7, wherein said connecting element comprises a connector part which is electrically connected with said other pole of each take-off and electrically insulated relative to said bolt.

9. A transducer device according to claim 8, wherein said other pole of each take-off is electrically connected with said connector part by means of movable scissor-type contact blades.

10. A transducer device according to claim 8, wherein said connector part is designed as the first contact and the end of said bolt as the second contact of a bipolar connector socket.

* * * * *